(12) United States Patent
Fan Jiang et al.

(10) Patent No.: US 7,724,343 B2
(45) Date of Patent: May 25, 2010

(54) LIQUID CRYSTAL DISPLAY PANEL

(75) Inventors: Shih-Chyuan Fan Jiang, Hsinchu (TW); Ching-Huan Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 271 days.

(21) Appl. No.: 11/778,660

(22) Filed: Jul. 17, 2007

(65) Prior Publication Data
US 2008/0088774 A1 Apr. 17, 2008

(30) Foreign Application Priority Data
Oct. 16, 2006 (TW) .............. 95138010 A

(51) Int. Cl.
*G02F 1/1339* (2006.01)
(52) U.S. Cl. ....................................... 349/155
(58) Field of Classification Search .................. 349/155
See application file for complete search history.

(56) References Cited

U.S. PATENT DOCUMENTS

| 6,567,139 | B2 | 5/2003 | Huang |
| 2005/0122452 | A1 | 6/2005 | Yoshida et al. |
| 2005/0237459 | A1 | 10/2005 | Ikeda et al. |
| 2005/0248712 | A1 | 11/2005 | Higa et al. |
| 2006/0044502 | A1 | 3/2006 | Takagi |
| 2006/0050209 | A1 | 3/2006 | Higa |
| 2006/0197898 | A1 | 9/2006 | Kurasawa |
| 2007/0084607 | A1 | 4/2007 | Wright et al. |

FOREIGN PATENT DOCUMENTS

| CN | 1584674 | 2/2005 |
| CN | 1818758 | 8/2006 |
| JP | 2001-154205 | 6/2001 |
| JP | 2001201750 | 7/2001 |
| JP | 2004-128604 | 4/2004 |
| JP | 2006-003830 | 1/2006 |
| JP | 2006-072086 | 3/2006 |
| JP | 2006-119327 | 5/2006 |
| TW | 387997 | 4/2000 |

*Primary Examiner*—Jerry T Rahll
(74) *Attorney, Agent, or Firm*—Jianq Chyun IP Office

(57) ABSTRACT

An LCD panel including a first substrate, a second substrate disposed above the first substrate, a plurality of signal lines disposed on the first substrate, and a plurality of sub-pixel sets arranged between the first substrate and the second substrate. Each sub-pixel set includes a plurality of sub-pixels electrically connected to the corresponding signal lines. Each sub-pixel has at least one alignment pattern located therein. Additionally, the alignment pattern located in one sub-pixel of each sub-pixel set supports between the first substrate and the second substrate as a spacer.

13 Claims, 10 Drawing Sheets

LIQUID CRYSTAL DISPLAY PANEL

CROSS-REFERENCE TO RELATED APPLICATION

This application claims the priority benefit of Taiwan application serial no. 95138010, filed Oct. 16, 2006. All disclosure of the Taiwan application is incorporated herein by reference.

BACKGROUND OF THE INVENTION

1. Field of Invention

The present invention relates to a liquid crystal display (LCD) panel and, more particularly, to an LCD panel with excellent display quality.

2. Description of Related Art

Currently, the development of thin film transistor-liquid crystal displays (TFT-LCDs) is toward high contrast ratio, no gray scale inversion, high brightness, high color saturation, quick response, and wide viewing angle, etc in the market. The common wide viewing angle techniques include twisted nematic (TN) type of the liquid crystal with wide viewing film, in-plane switching (IPS) LCD, fringe field switching (FFS) LCD, and multi-domain vertical alignment (MVA) LCD. For example, the MVA LCD panel uses some alignment patterns, such as alignment protrusions or the slits to make liquid crystal molecules in each pixel arranged in multi-orientation, thereby obtaining multiple different alignment domains. As the alignment protrusions or slits formed on the color filter substrate or the TFT array substrate can make the liquid crystal molecules being arranged in multi-orientation, thereby obtaining multiple different alignment domains, the conventional MVA LCD panels can meet the requirement for wide viewing angle.

FIG. 1 is a top schematic view of a conventional MVA LCD panel. Referring to FIG. 1, the conventional transflective MVA LCD panel 100 comprises a plurality of alignment protrusions P disposed on a color filter substrate, and the alignment protrusions P are corresponding to a reflective electrode Re and a transmissive electrode Tr. A main slit SS exists between the reflective electrode Re and the transmissive electrode Tr, which is used to make liquid crystals LC at the edge of the transmissive electrode Tr and the reflective electrode Re tilt towards the alignment protrusions P. As the alignment protrusions P are disposed between the reflective electrode Re and the transmissive electrode Tr, the alignment protrusions P can change the distribution of electric lines to make the liquid crystals LC tilt towards the alignment protrusions P, so as to achieve the objective of wide viewing angle. Moreover, a connecting electrode C is disposed between the reflective electrode Re and the transmissive electrode Tr, so that the reflective electrode Re can be electrically connected to the transmissive electrode Tr. The material of the connecting electrode C may be the same as that of the reflective electrode Re or the transmissive electrode Tr. The common transflective MVA LCD panel 100 may adopt ball spacers to maintain the cell-gap. However, the design has the disadvantage that usually a light leakage problem in a dark-state exists around the ball spacers, resulting in the decrease of contrast ratio of the transflective MVA LCD panel 100. In addition, the current transflective MVA LCD panel 100 also uses photo spacers PS on the color filter substrate to maintain the cell-gap. Generally, the photo spacers PS are mostly made of an organic material, but the light leakage problem in the dark-state also exists around the photo spacers PS.

In view of the above, as the ball spacers or the photo spacers PS has the light leakage problem in dark-state, the arrangement position of the ball spacers or the photo spacers PS becomes quite important. Taking the photo spacers PS on the color filter substrate as an example, in order to avoid the light leakage problem in dark-state, a stage 110 is usually disposed on the thin film transistor array substrate, so that the photo spacers PS can stably stand on the stage 110. As shown in FIG. 1, the photo spacers PS are usually located on a data line DL, so as to eliminate the influence of the photo spacers PS and the stage 110 to the aperture ratio. However, the stage 110 still decreases the aperture ratio.

SUMMARY OF THE INVENTION

Accordingly, the present invention provides an LCD panel with excellent optical representation.

The present invention provides an LCD panel, wherein the effective display areas of each sub-pixel is substantially equal.

The present invention provides an LCD panel comprising a first substrate, a second substrate disposed above the first substrate, a plurality of signal lines disposed on the first substrate, and a plurality of sub-pixel sets arranged between the first substrate and the second substrate is provided. Each sub-pixel set comprises a plurality of sub-pixels electrically connected to the signal lines, each sub-pixel has at least one alignment pattern located in the sub-pixel, and the alignment pattern in one of the sub-pixels of each sub-pixel set disposes between the first substrate and the second substrate as a spacer.

The present invention provides an LCD panel, which comprises a first substrate, a second substrate disposed above the first substrate, a plurality of signal lines disposed on the first substrate, and a plurality of sub-pixel sets arranged between the first substrate and the second substrate. Each sub-pixel set comprises a plurality of sub-pixels electrically connected to the signal lines, each sub-pixel set has a spacer disposed between the first substrate and the second substrate, and each spacer form a region in each corresponding sub-pixel set, wherein the area of the sub-pixel with the region is substantially greater than the area of other sub-pixels, and the effective display area of the sub-pixel with the region is substantially equal to the effective display area of other sub-pixels.

In order to the make aforementioned and other objects, features and advantages of the present invention comprehensible, preferred embodiments accompanied with figures are described in detail below.

DESCRIPTION OF EMBODIMENTS

The First Embodiment

Figure 1:
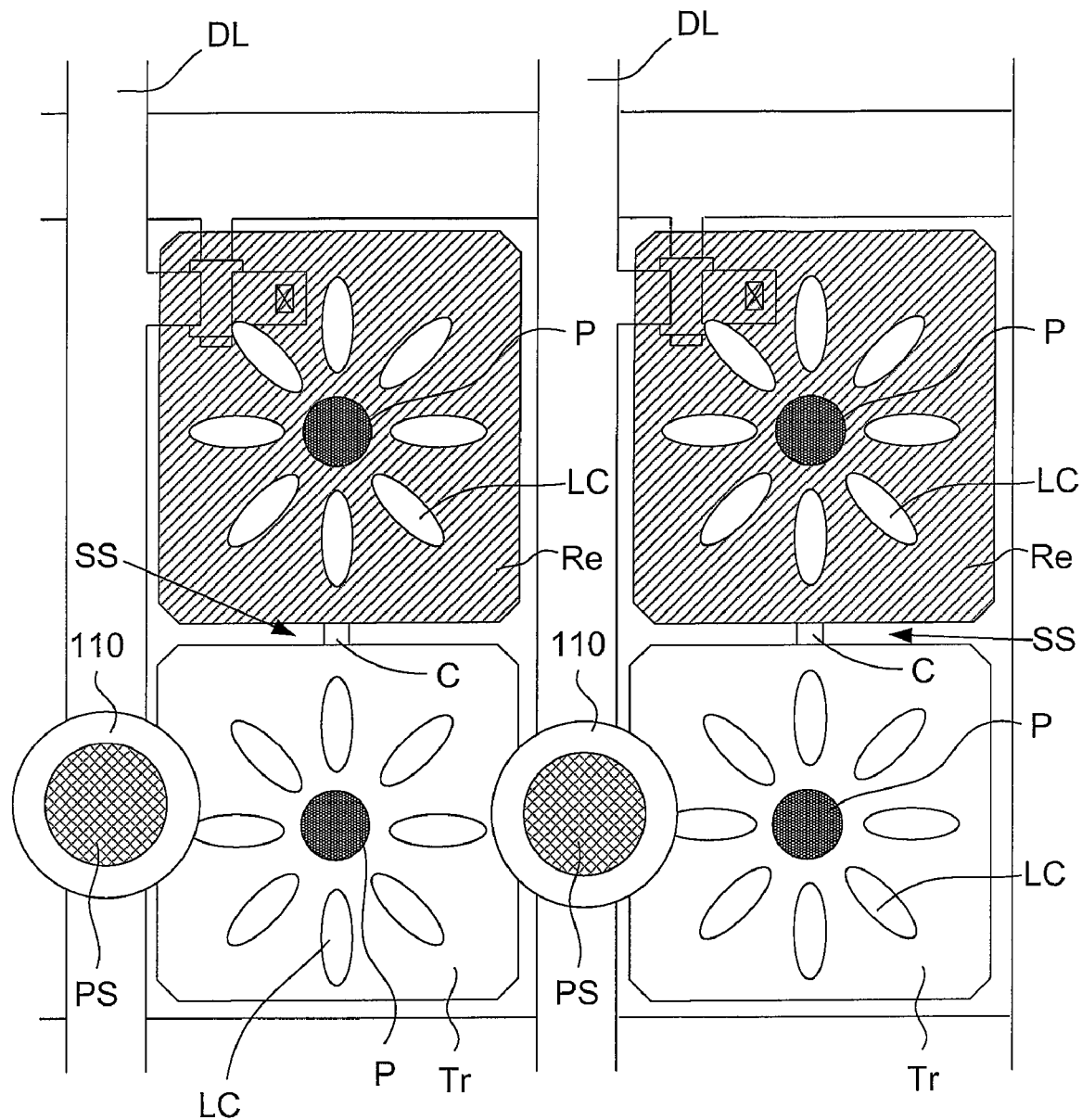
FIG. 1 is a top schematic view of a conventional MVA LCD panel.
Figure 2:
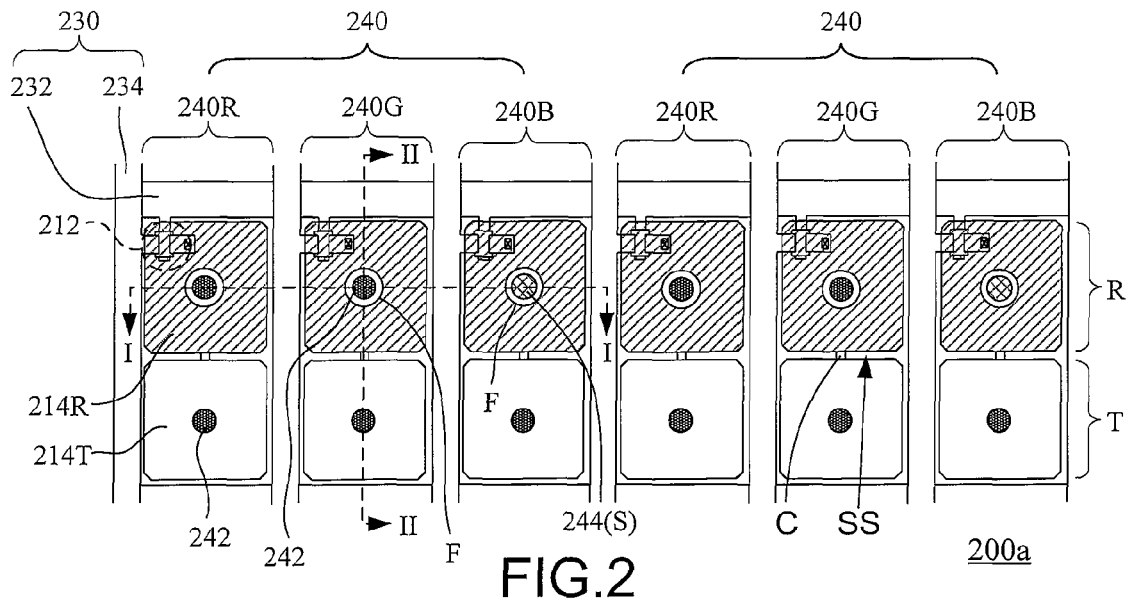
FIG. 2 is a top schematic view of an LCD panel of the first embodiment of the present invention.
Figure 3A:
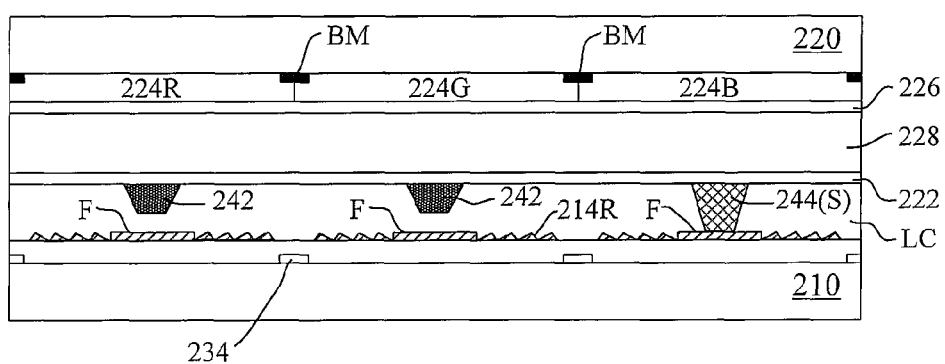
FIG. 3A is a schematic cross-sectional view taken along the I-I section line in FIG. 2.
Figure 3B:
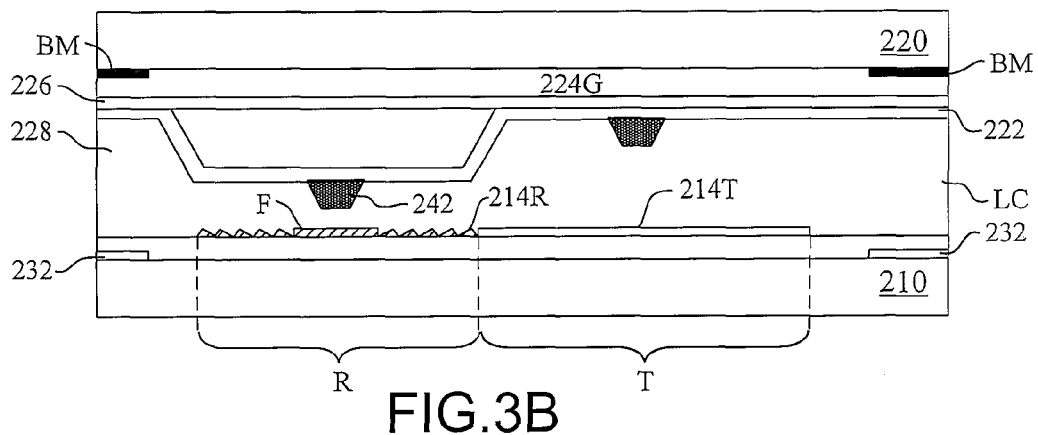
FIG. 3B is a schematic cross-sectional view taken along the II-II section line in FIG. 2.

FIG. 2 is a top schematic view of an LCD panel of the first embodiment of the present invention, FIG. 3A is a schematic cross-sectional view taken along the I-I section line in FIG. 2, and FIG. 3B is a schematic cross-sectional view taken along the II-II section line in FIG. 2. Referring to FIGS. 2, 3A, and 3B together, the LCD panel of this embodiment of the present invention includes a first substrate 210, a second substrate 220 disposed above the first substrate 210, a plurality of signal lines 230 disposed above the first substrate 210, and a plurality of sub-pixel sets 240. As shown in FIG. 2, the plurality of sub-pixel sets 240 is arranged between the first substrate 210 and the second substrate 220. Each sub-pixel set 240 includes a plurality of sub-pixels 240R, 240G, 240B electrically connected to the signal lines 230, each of the sub-pixels 240R, 240G, 240B has at least one alignment patterns 242, 244 located therein, and the alignment pattern 244 in one of the sub-pixels (e.g. the sub-pixel 240B) in each sub-pixel set disposed between the first substrate 210 and the second substrate 220 so as to support the first substrate 210 and the second substrate 220 as a spacer S. In this embodiment, the spacer S may be fabricated on the first substrate 210 or on the second substrate 220, and is made of, for example, an organic material. However, the material of the spacer S is not limited to the organic material in the present invention, and can be other suitable materials.

As shown in FIG. 2 that a main slit SS exists between a reflective electrode 214R and a transmissive electrode 214T, which is used to make liquid crystals LC at the edge of the transmissive electrode 214T and the reflective electrode 214R tilt towards alignment protrusions 242, 244. As the alignment protrusions 242, 244 are disposed between the reflective electrode 214R and the transmissive electrode 214T, the alignment protrusions 242, 244 may change the distribution of electric lines to make the liquid crystal LC tilt towards the alignment protrusions 242, 244, so as to achieve the objective of the wide viewing angle. Moreover, a connecting electrode C exists between the reflective electrode 214R and the transmissive electrode 214T, so that the reflective electrode 214R can be electrically connected to the transmissive electrode 214T. The electrode material of the connecting electrode C may be the same as that of the reflective electrode 214R, the transmissive electrode 214T, or combinations thereof.

In this embodiment of the present invention, although three sub-pixels 240R, 240G, 240B are used as a sub-pixel set 240, the quantity of the sub-pixels in each sub-pixel set 240 is not limited in the present invention, i.e. the quantity of the sub-pixels is an integer greater than or equal to 2. The quantity of the sub-pixels in each sub-pixel set 240 is relative to the distribution density of the spacers S, and those of ordinary skill in the art can determine the quantity of the sub-pixels in each sub-pixel set 240 according to the required distribution density of the spacers S. It should be noted that the quantity of the sub-pixels in each sub-pixel set 240 and the quantity of the sub-pixels in each pixel have no absolute relation. In detail, each pixel generally is formed by three sub-pixels (e.g. the sub-pixels 240R, 240G, 240B), and the quantity of the sub-pixels in each sub-pixel set 240 may be equal to 3 or may not be equal to 3.

For example, the first substrate 210 and the second substrate 220 are, for example, rigid substrates (such as glass substrates, quartz substrates, silicon substrates, ceramic, or likes) or flexible substrates (such as plastic substrates, or likes). The signal lines 230 on the first substrate 210 include a plurality of scan lines 232 and a plurality of data lines 234. In addition, the sub-pixels 240R, 240G, 240B of this embodiment include transmissive sub-pixels, reflective sub-pixels, transflective sub-pixels, or the combination thereof, and only the transflective sub-pixels are shown in FIGS. 2, 3A, and 3B as an exemplification of this embodiment of the present invention to illustration. When the sub-pixels 240R, 240G, 240B are transflective sub-pixels, the sub-pixels 240R, 240G, 240B may be transflective sub-pixels with single cell-gap, transflective sub-pixels with dual cell-gap, or the combination thereof, and the transflective sub-pixels with dual cell-gap are shown in FIGS. 2, 3A, and 3B as an exemplification of this embodiment of the present invention to illustration.

It can be known form FIGS. 2, 3A, and 3B that the sub-pixels 240R, 240G, 240B have a reflective multi-domain display region R and a transmissive multi-domain display region T adjacent to the reflective multi-domain display region R, and each of the sub-pixels 240R, 240G, 240B includes a common electrode 222 disposed on the second substrate 220, an active device 212 disposed on the first substrate 210, a reflective electrode 214R disposed in the reflective multi-domain display region R, a transmissive electrode 214T disposed in the transmissive multi-domain display region T, and a liquid crystal layer LC disposed between the common electrode 222 and the reflective electrode 214R and between the common electrode 222 and the transmissive electrode 214T. The reflective electrode 214R and the transmissive electrode 214T are electrically connected to each other, and electrically connected to the corresponding signal line 230 through the active device 212. In detail, the reflective electrode 214R and transmissive electrode 214T electrically connected with each other may be electrically connected to the corresponding scan line 232 and the data line 234 through the active device 212.

It can be known from FIG. 2 that the spacers S are located in a part of the reflective multi-domain display region R. In detail, each sub-pixel 240 has one spacer S, and the spacer S may be located above one reflective electrode 214R of the sub-pixel set 240. In order to make the spacer S stably stand on the corresponding reflective electrode 214R, in this embodiment, a planar region F is designed on the reflective electrode 214R under the spacer S. It should be noted that the planar region F of the reflective electrode 214R can reduce the effective reflective area of the reflective electrode 214, thus further reducing the aperture ratio of the reflective multi-domain display region R. As the distribution position of the spacer S is above one reflective electrode 214R, in order to make the effective reflective areas (i.e. effective display areas) of all the reflective electrodes 214R to be substantially equal, in this embodiment, a planar region F corresponding to the alignment pattern 242 is disposed in other reflective electrode 214, and the areas of all the planar regions F are substantially the same.

It can be known from FIGS. 3A and 3B that besides the common electrode 222, other film layers can be fabricated on the second substrate 220 of this embodiment according to the requirements. For example, the second substrate 220 can further include a black matrix BM, color filter layers 224R, 224G, 224B, an overcoat 226, and a stepper 228 on color filter. The black matrix BM is disposed on the second substrate 220, and the color filter layers 224R, 224G, 224B overlay on the black matrix BM and the second substrate 220. Moreover, the overcoat 226 overlays on the color filter layers 224R, 224G, 224B, and the stepper 228 on color filter overlay on a part of the overcoat 226. It should be noted that the stepper 228 on color filter is mainly used to adjust the cell-gap of the reflective multi-domain display region R, such that the cell-gap of the transmissive multi-domain display region T is substantially twice of the reflective multi-domain display region R, but the present invention is not limited herein, as long as the cell-gap of the transmissive multi-domain display region T is substantially greater than the reflective multi-domain display region R. The material of the black matrix BM comprises a single layer or multi-layer of metal, organic material, color photoresist, or the combination thereof. For example, the black matrix BM can be formed by stacking a plurality of color photoresists.

As in this embodiment, the spacers S with alignment function substitute a part of the alignment pattern 242, it is not necessary to dispose an additional spacers to maintain the cell-gap between the first substrate 210 and the second substrate 220, and this design promotes the increase of the aperture ratio of the LCD panel 200a. In addition, the planar region F is disposed in each reflective electrode 214R to make the effective display areas of all the reflective multi-domain display regions R to be the same, thus improving the display quality of the LCD panel 200a.

The Second Embodiment

In the following embodiment and drawings, the same or like numbers stand for the same or like elements for simple illustration.

Figure 4:
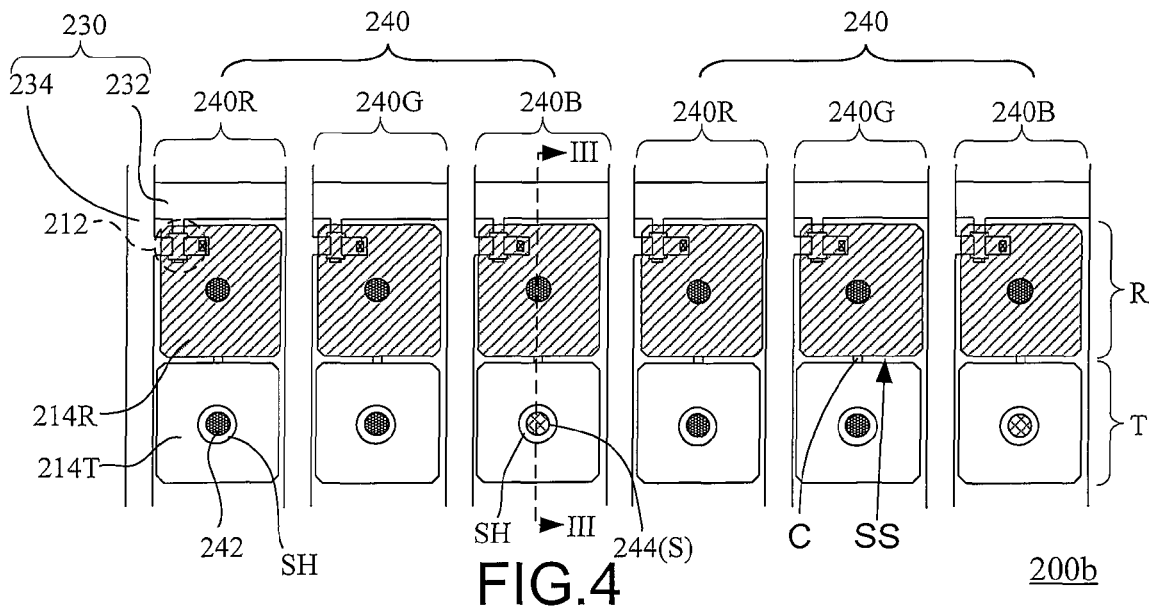
FIG. 4 is a top schematic view of the LCD panel of the second embodiment of the present invention.
Figure 5A:
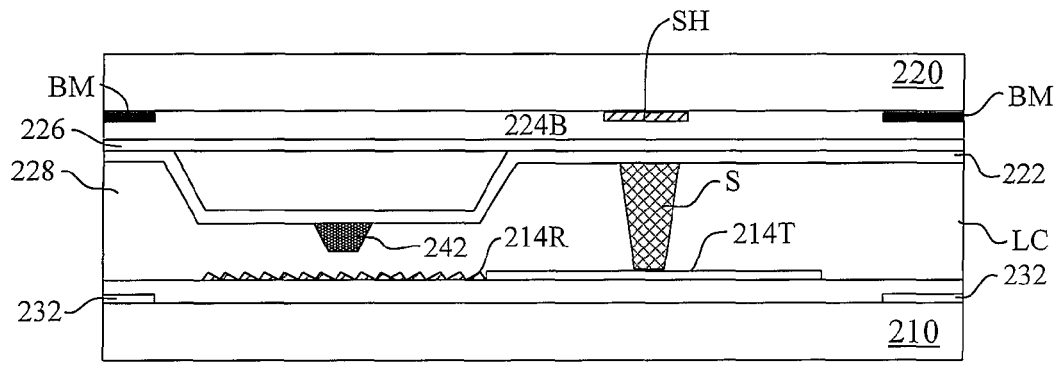
FIGS. 5A and 5B are schematic cross-sectional views taken along the III-III section line in FIG. 4.
Figure 5B:
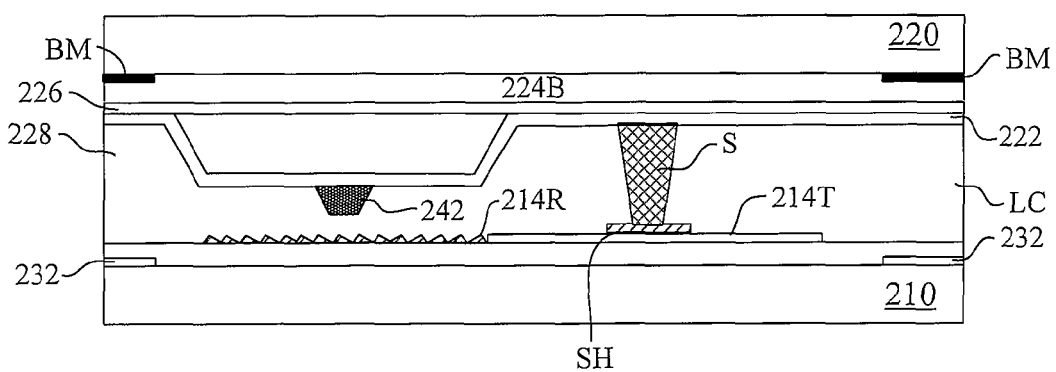

FIG. 4 is a top schematic view of the LCD panel of the second embodiment of the present invention, and FIGS. 5A and 5B are schematic cross-sectional views taken along the III-III section line in FIG. 4. Referring to FIG. 4, the LCD panel 200b of this embodiment is similar to the LCD panel 200a of the first embodiment, except that in the LCD panel 200b, the spacers S are disposed in the transmissive multi-domain display region T.

In order to improve the display quality of the transmissive multi-domain display region T, in this embodiment, a shielding pattern SH may be disposed on the transmissive electrode 214T (as shown in FIG. 5B), so as to avoid the light leakage in the dark-state caused by the spacer S and the alignment pattern 242. In addition, in this embodiment, a shielding pattern SH may be disposed above the spacer S and the alignment pattern 242 (as shown in FIG. 4 and FIG. 5A), so as to avoid the light leakage in the dark-state caused by the spacers S and the alignment pattern 242. For example, the shielding pattern SH may be integrated with the black matrix BM. It should be noted that in this embodiment, the areas of the shielding patterns SH in each transmissive multi-domain display region T can be made to be substantially equal, so as to make the effective transmissive areas (i.e. effective display areas) of all the transmissive electrode 214R to be substantially equal. The material of the black matrix BM comprises a single layer or a multi-layer of metal, organic material, color photoresist, or the combination thereof. For example, the black matrix BM may be formed by stacking a plurality of color photoresists. Accordingly, the material of the shielding patterns SH adopted by this embodiment may be same as or different from the material of the black matrix BM.

The Third Embodiment

Figure 6A:
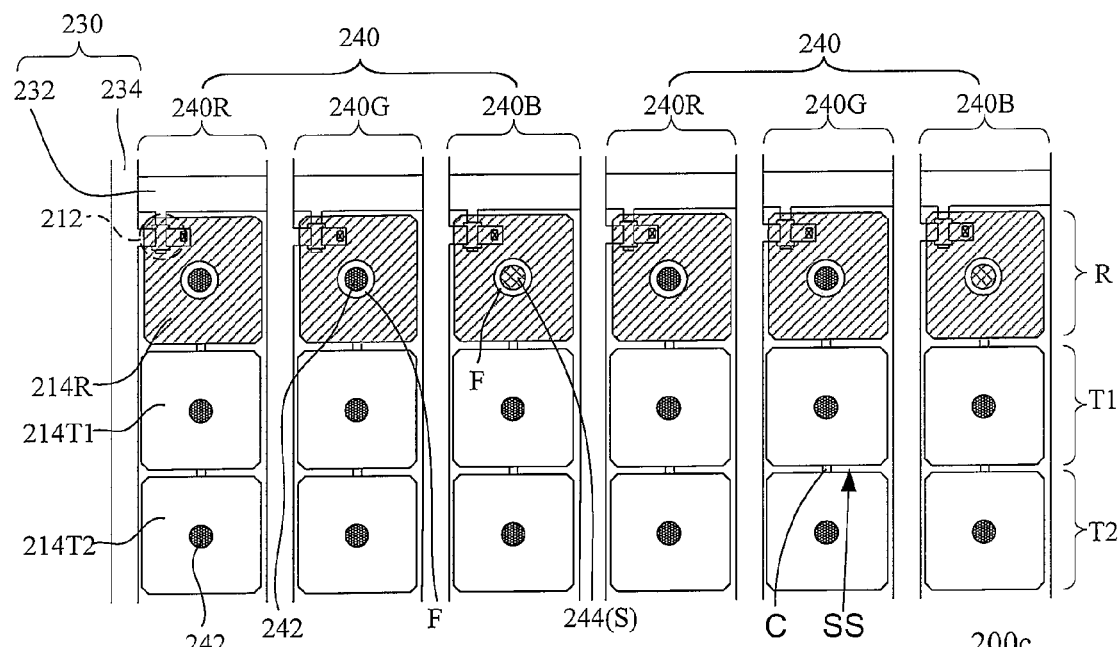
FIGS. 6A to 6D are top schematic views of the LCD panel of the third embodiment of the present invention.

FIGS. 6A to 6D are top schematic views of the LCD panel of the third embodiment of the present invention. Referring to FIGS. 3B and 6A together, the LCD panel 200c of this embodiment is similar to the LCD panel 200a of the first embodiment, except that each of the sub-pixels 240R, 240G, 240B of this embodiment has two transmissive multi-domain display regions (i.e. the first transmissive multi-domain display region T1 and the second transmissive multi-domain display region T2), and a first transmissive electrode 214T1 and a second transmissive electrode 214T2 are respectively disposed in the first transmissive multi-domain display region T1 and the second transmissive multi-domain display region T2. Moreover, the reflective electrode 214R, the first transmissive electrode 214T1, and the second transmissive electrode 214T2 are electrically connected with one another, and electrically connected to the corresponding signal line 230 through the active device 212. In detail, the reflective electrode 214R, first transmissive electrode 214T1, and second transmissive electrode 214T2 electrically connected with one another are electrically connected to the corresponding scan line 232 and data line 234 through the active device 212.

Figure 6B:
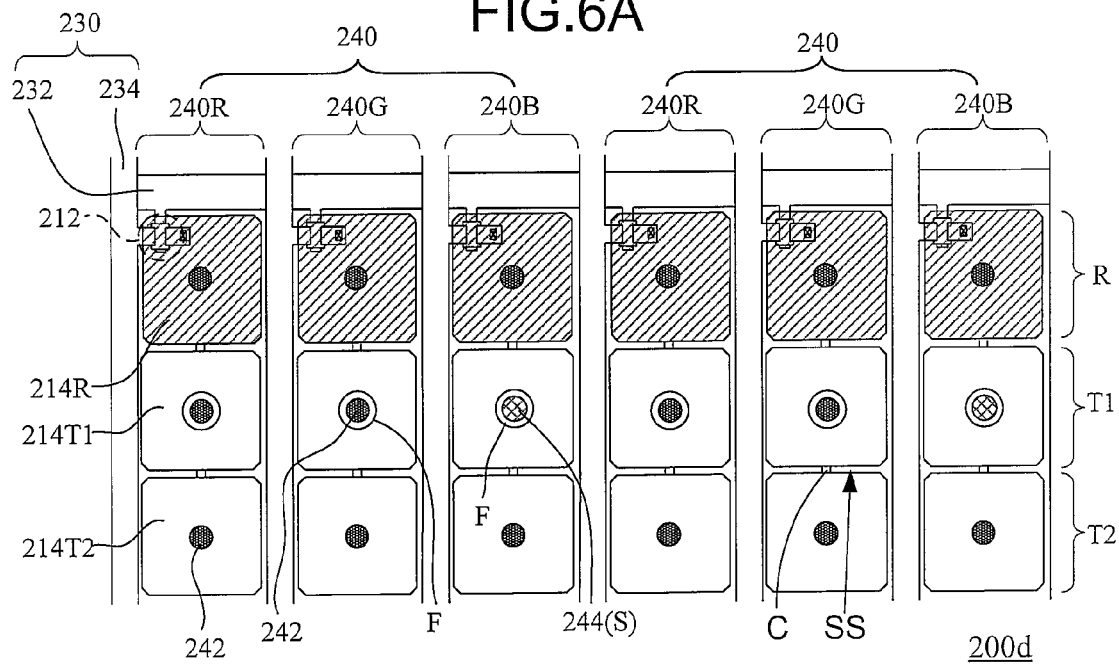
Figure 6C:
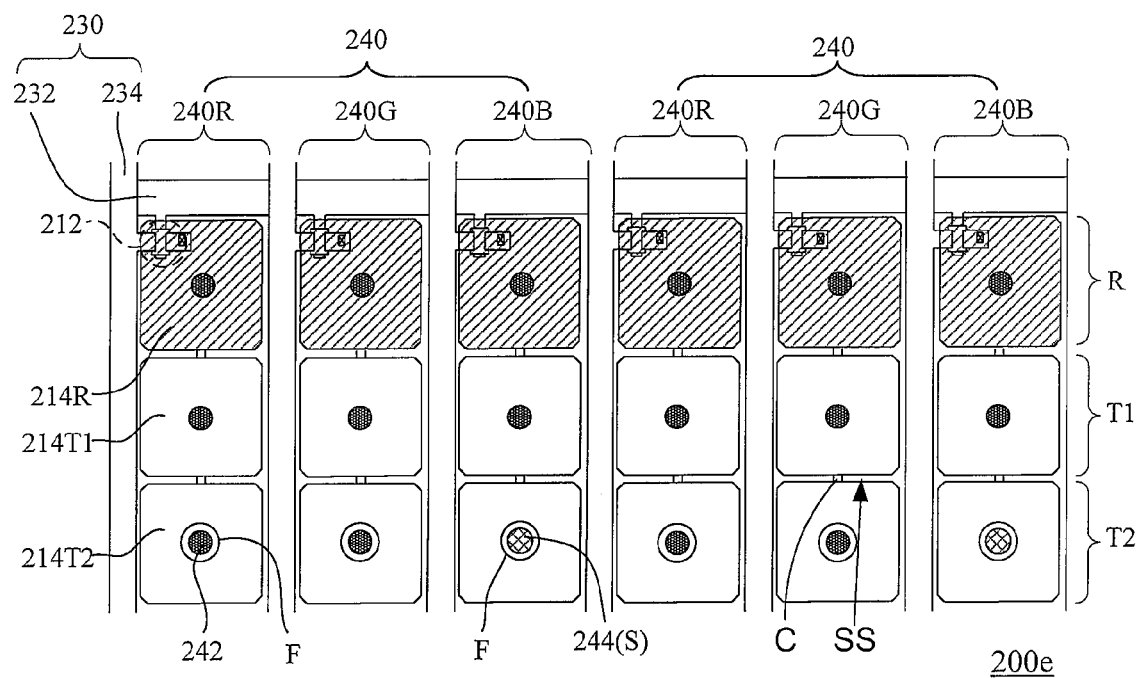
Figure 6D:
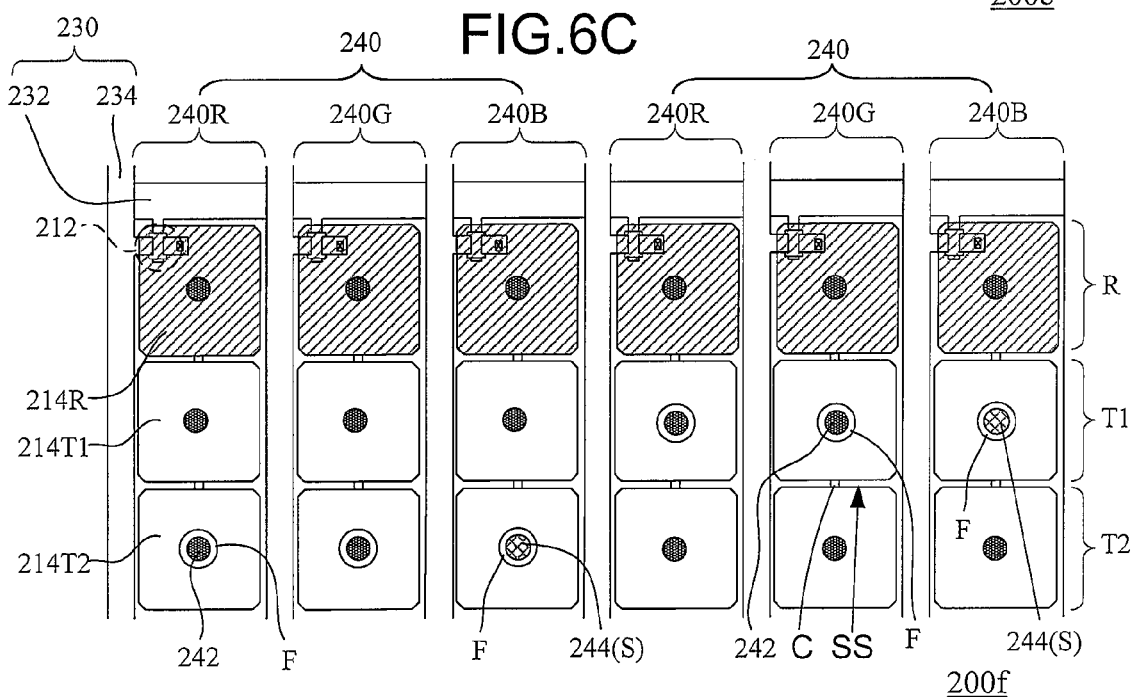

Next, referring to FIGS. 6B to 6D, in this embodiment, the LCD panels 200d, 200e, 200f are similar to the LCD panel 200c, but different in the distribution positions of the spacer S and the shielding pattern SH in the LCD panels 200d, 200e, 200f. In detail, the spacer S and the shielding pattern SH are, for example, distributed in the first transmissive multi-domain display region T1 of each sub-pixel (as shown in FIG. 6B), or distributed in the second transmissive multi-domain display region T2 of each sub-pixel (as shown in FIG. 6C). Definitely, the spacer S and the shielding pattern SH may also be distributed in the first transmissive multi-domain display region T1 and the second transmissive multi-domain display region T2 in different sub-pixels (as shown in FIG. 6D). The material of the shielding pattern SH may be the same as or different from the material of the black matrix BM, and the material of the shielding pattern SH may be formed by a single layer or a multi-layer of metal, organic material, color photoresist, or the combination thereof. For example, the black matrix BM may be formed by stacking a plurality of color photoresists.

The Fourth Embodiment

Figure 7A:
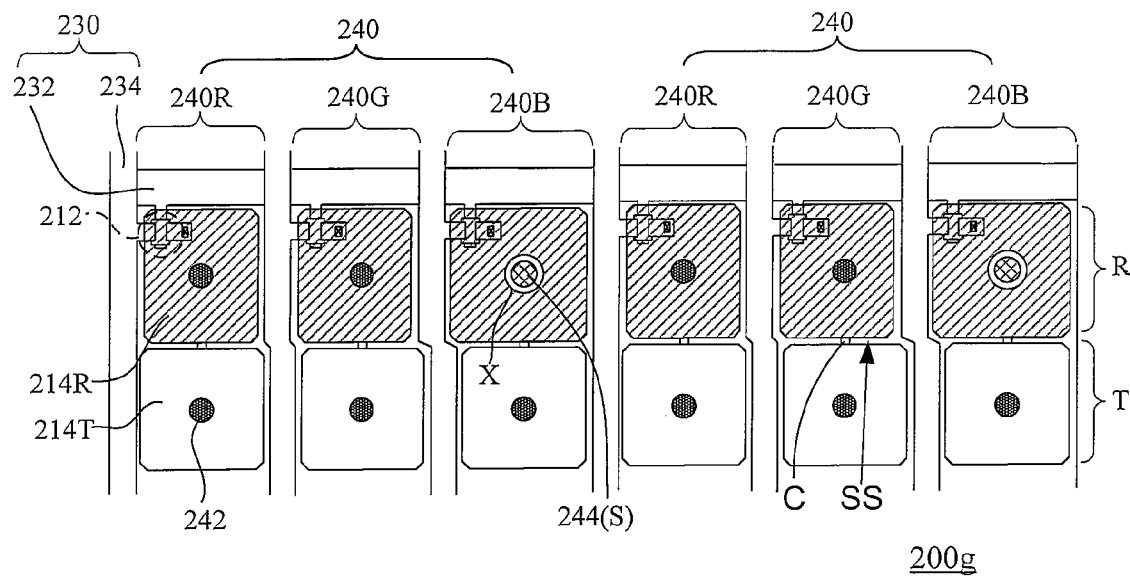
FIGS. 7A to 7D are top schematic views of the LCD panel of the fourth embodiment of the present invention.

FIGS. 7A to 7D are top schematic views of the LCD panel of the fourth embodiment of the present invention. Referring to FIG. 7A, the LCD panel 200g of this embodiment is similar to that of the first embodiment, except that each spacer S in the LCD panel 200g forms a region X in each corresponding sub-pixel set 240, wherein the area of the sub-pixel 240 with the region X is substantially greater than that of the other sub-pixel 240R, 240G, and the effective display area of the sub-pixel 240B with the region X is substantially equal to the effective display area of other sub-pixels 240R and 240G.

It is known from FIG. 7A that the region X is located in a part of the reflective multi-domain display region R. In detail, each sub-pixel set 240 includes three sub-pixels 240R, 240G, 240B. If the average of the areas of the reflective multi-domain display regions R in the three sub-pixels 240R, 240G, 240B is A1 and the area of each region is B, in this embodiment, the area of the reflective multi-domain display region R with the region X is designed to be [A1+(2B/3)], and the area of other reflective multi-domain display regions R is designed to be [A1−(B/3)]. However, the quantity of the sub-pixels in each sub-pixel set 240 is not limited in the present invention. If each sub-pixel set includes N sub-pixels, the average of the areas of the reflective multi-domain display regions in N sub-pixels is A1, and the area of each region is B, in this embodiment, the area of the reflective multi-domain display region R with the region X is designed to be [A1+((N−1)*B/

N)], and the area of other reflective multi-domain display regions R is designed to be [A1−(B/N)], i.e. the quantity of the N sub-pixels is substantially greater than 1, for example 2, 3, 4, 5, 6, . . . , N.

Figure 7B:
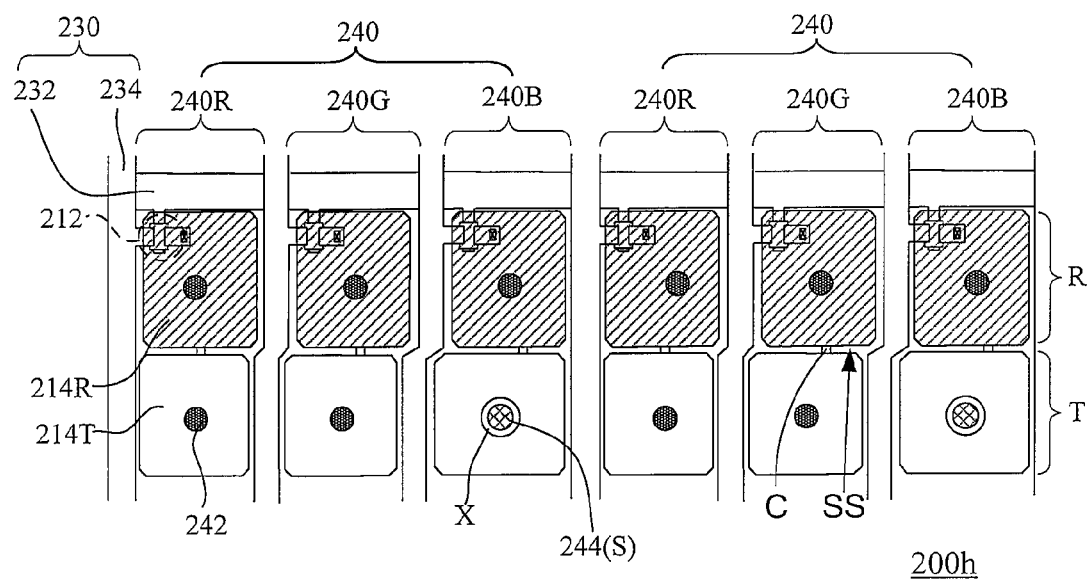

In view of the above, the region X can be located in a part of the transmissive multi-domain display region T, for example the LCD panel 200h shown in FIG. 7B. In detail, each sub-pixel set 240 includes three sub-pixels 240R, 240G, 240B. If the average of the areas of the transmissive multi-domain display regions T in the three sub-pixels 240R, 240G, 240B is A2 and the area of each region is B, in this embodiment, the area of the transmissive multi-domain display region T with the region X is designed to be [A2+(2B/3)], and the area of other transmissive multi-domain display regions T is designed to be [A2−(B/3)]. However, the quantity of the sub-pixels in each sub-pixel set 240 is not limited in the present invention. If each sub-pixel set 240 includes N sub-pixels, the average of the areas of the transmissive multi-domain display regions T in N sub-pixels is A2 and the area of each region X is B, in this embodiment, the area of the transmissive multi-domain display region T with the region X may be designed to be [A2+((N−1)*B/N)], and the area of other transmissive multi-domain display regions T is designed to be [A2−(B/N)], i.e. the quantity of the N sub-pixels is greater than 1, for example, 2, 3, 4, 5, 6, . . . , N.

Figure 7C:
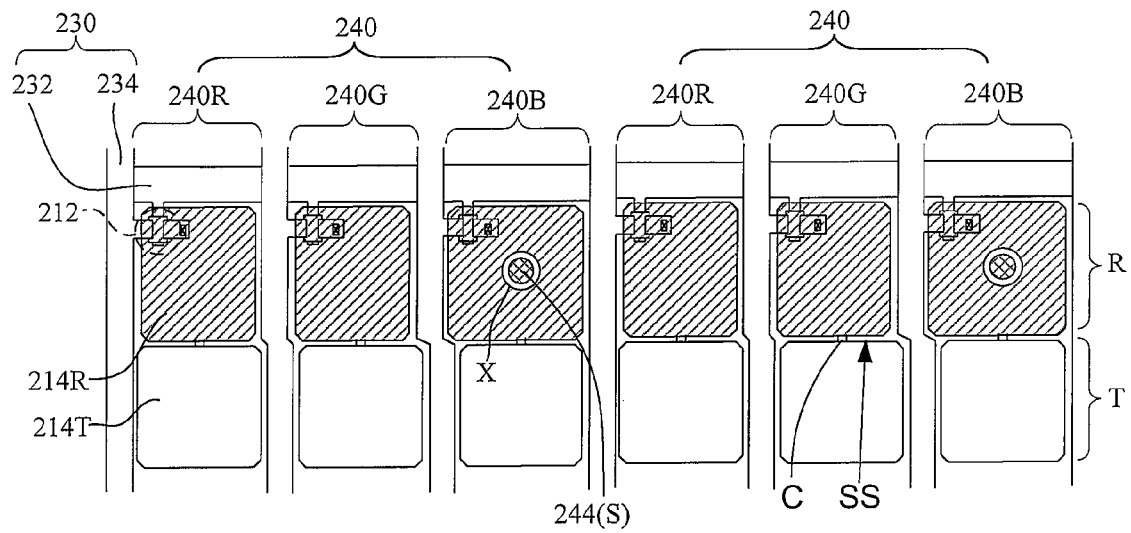
Figure 7D:
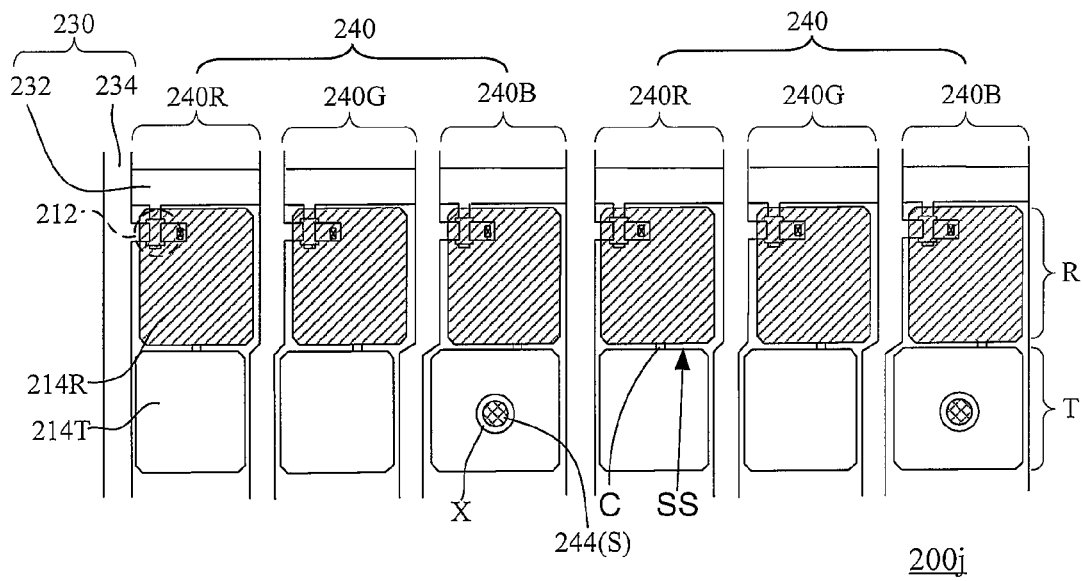

Then, referring to FIGS. 7C and 7D, the LCD panel 200i is similar to the LCD panel 200g, and the LCD panel 200j is similar to the LCD panel 200h, except that each of the sub-pixels 240R, 240G, 240B in the LCD panel 200i and the LCD panel 200j do not have the alignment pattern 242. In other words, besides the MVA LCD panel, the design concept of this embodiment can also be applied in other LCD panel without the alignment pattern.

The Fifth Embodiment

Figure 8A:
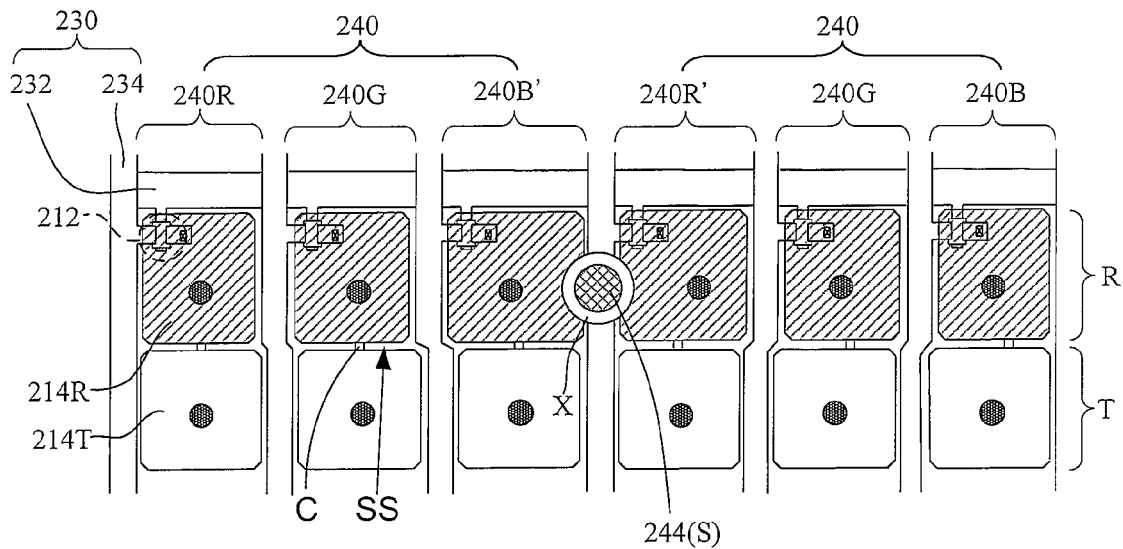
FIGS. 8A to 8D are top schematic views of the LCD panel of the fifth embodiment of the present invention.

FIGS. 8A to 8D are top schematic views of the LCD panel of the fifth embodiment of the present invention. Referring to FIG. 8A, the LCD panel 200k of this embodiment is similar to the LCD panel 200g of the fourth embodiment, except that the region X formed by each spacer S in the LCD panel 200k may span across two of the adjacent reflective multi-domain display regions R. The areas of the sub-pixel 240B', 240R' with the region X may be substantially greater than the other sub-pixels 240R, 240G, 240B, and the effective display areas of the sub-pixels 240B', 240R' with the region X may be substantially equal to the effective display areas of other sub-pixels 240R, 240G, 240B.

It is known from FIG. 8A that the region X is located in a part of the reflective multi-domain display region R. In detail, each sub-pixel set 240 includes six sub-pixels 240B', 240R', 240R, 240G, 240B. If the average of the areas of the reflective multi-domain display regions R in the six sub-pixels 240B', 240R', 240R, 240G, 240B is A1 and the area of each region X is B, in this embodiment, the area of the two reflective multi-domain display regions R with the region X is [A1+(B/3)], and the area of other reflective multi-domain display regions R is [A1−(B/6)]. However, the quantity of the sub-pixels in each sub-pixel set 240 is not limited in the present invention. If each sub-pixel set includes N sub-pixels, the average of the areas of the reflective multi-domain display regions R in the N sub-pixels is A1, and the area of each region X is B, the area of the two reflective multi-domain display regions R with the region X is [A1+((N−2)*B/2N)], and the area of other reflective multi-domain display regions R is [A1−(B/N)], i.e. the quantity of the N sub-pixels is greater than 1, for example 2, 3, 4, 5, 6, . . . , N.

Figure 8B:
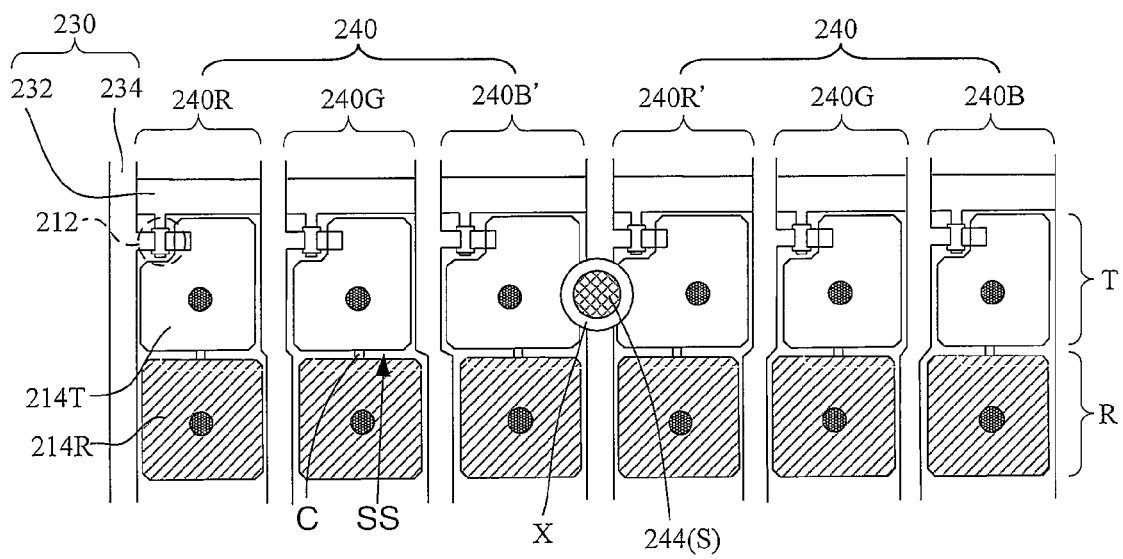

In view of the above, the region X may be located in a part of the transmissive multi-domain display region T, for example the LCD panel 200l as shown in FIG. 8B. In detail, each sub-pixel set 240 includes six sub-pixels 240B', 240R', 240R, 240G, 240B. If the average of the areas of the transmissive multi-domain display regions T in the six sub-pixels 240B', 240R', 240R, 240G, 240B is A2 and the area of each region X is B, in this embodiment, the area of the transmissive multi-domain display region T with the region X is designed to be [A2+(B/3)], and the area of other transmissive multi-domain display regions T is designed to be [A2−(B/6)]. However, the quantity of the sub-pixels in each sub-pixel set 240 is not limited in the present invention. If each sub-pixel set 240 includes N sub-pixels, the average of the areas of the transmissive multi-domain display regions T in the N sub-pixels is A2 and the area of each region X is B, in this embodiment, the area of the transmissive multi-domain display region T with the region X is designed to be [A2+((N−2)*B/2N)], and the area of other transmissive multi-domain display regions T is designed to be [A2−(B/N)], i.e. the quantity of the N sub-pixels is greater than 1, for example 2, 3, 4, 5, 6, . . . , N. However, the transmissive multi-domain display regions T can be located at some region that is far away form the region within active device.

Figure 8C:
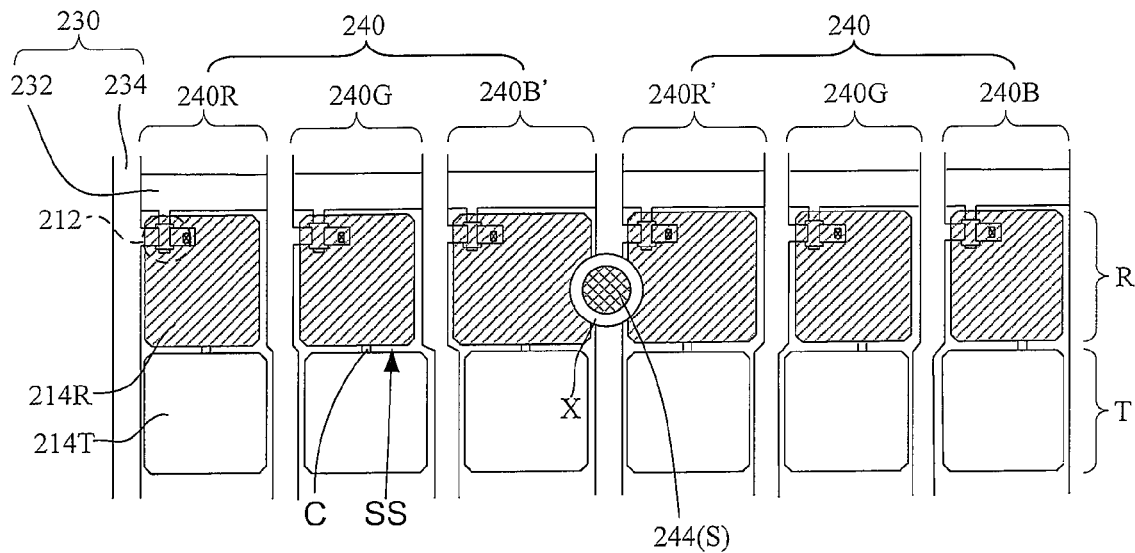
Figure 8D:
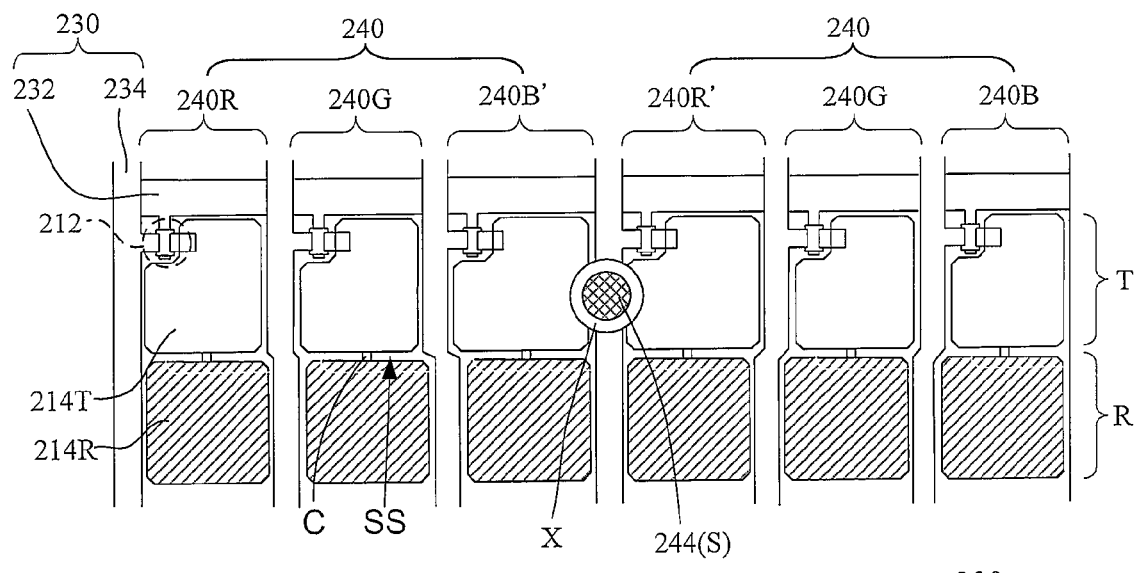

Next, referring to FIGS. 8C and 8D, the LCD panel 200m is similar to the LCD panel 200k, and the LCD panel 200n is similar to the LCD panel 200l, except that each of the sub-pixels 240B', 240R', 240R, 240G, 240B in the LCD panel 200m and the LCD panel 200n does not have the alignment pattern 242. In other words, besides the MVA LCD panel, the design concept of this embodiment may also be applied in other LCD panel without the alignment pattern. However, the transmissive multi-domain display regions in the FIG. 8D (not shown) can be located at some region that is far away form the region within active device.

For example, in this embodiment, the position of the region X may be located on the signal line 230 (including at least one of the scan line 232 or the data line 234) of the first substrate 210, or may be located on the black matrix BM of the second substrate 220, but in this embodiment, the region X located on the data line 234 is taken as an example for illustration. The material of the black matrix BM is, for example, formed by a single layer or a multi-layer of metal, organic material, color photoresist, or the combination thereof. For example, the black matrix BM may be formed by stacking a plurality of color photoresists.

Further, the sub-pixels of the embodiments of the present invention are, for example, red sub-pixels, green sub-pixels, and blue sub-pixels for illustration, and in principle, the position of the spacer S will not influence the viewer's sensitivity to colors. That is, the color sub-pixels including sub-pixels of red, green, blue, or other colors in the color index coordinate (CIE), such as white, pink, yellow, orange, tangerine, fuschin red, purple, brown, cyan, indigo, bluish green, and black can be used. Preferably, the position of the spacer of the embodiment of the present invention is, for example, in the blue sub-pixel. However, in the present invention, the spacer is not limited to be disposed in the blue sub-pixel, the position of the spacer S may be located on the red sub-pixel, the green sub-pixel, or the sub-pixels of other colors. Definitely, the position of the spacer S of the embodiment of the present invention may be determined by using the following rule. For example, which color sub-pixel the spacer S is located on is determined by the absolute value of the light transmittance of the neighboring sub-pixels substantially in 50% to 10%, and preferably, the absolute value of the light transmittance substantially in 10% to 20%. Moreover, in the embodiments, the regular arrangement of the spacers is taken as the implementation example, but it is not limited herein. For example, the arrangement of six sub-pixels of FIG. 2 and FIG. 3 is taken as an example for illustration, when the spacers of the first sub-pixel set are arranged in the manner of FIG. 2, and the spacers of the second sub-pixel set are arranged in the manner of FIG. 3, the spacers of the sub-pixel set of the last column are arranged in the manner of FIG. 2, and the spacers of the sub-pixel set of the next column are arranged in the manner of FIG. 3, or the spacers of the sub-pixel set of a certain column are arranged in the manner of FIG. 2, and the spacers of the sub-pixel set of the last column are arranged in the manner of FIG. 3, and the position of the spacer of the column is located on the oblique diagonal of the position of the spacer of another column. Therefore, all the graphs of the embodiments of the present invention can be used in cooperation. It should be noted that the arrangement of the plurality of sub-pixel sets of the embodiments of the present invention are matrix arrangement, but it is not limited herein and can also be delta type, mosaic type, or other arrangements, or the combination thereof. Also, the shape of each sub-pixel of the plurality of sub-pixel sets of the embodiments of the present invention is not limited to be rectangular, and can also be other shaped, for example, substantially rhombus, substantially square, substantially hexagonal, substantially pentagonal etc., or the combination thereof.

In addition, the sub-pixel structure of the embodiments of the present invention is, for example, a common structure, that is the first substrate with the signal line or other elements and the second substrate with the color filter layer or other film layers. The present invention is not limited to this, and can also use the first substrate with the signal line, the color filter layer, or other elements and the second substrate without the color filter. When the color filter layer is fabricated on the first substrate, and the color filter layer is located on the signal line or other elements, this architecture is referred to as COA (color filter on array) architecture. When the color filter layer is located under the signal line or other elements, this architecture is referred to as AOC (array on color filter) architecture. In addition, although the alignment structure of the embodiments of the present invention is, for example, protrusions, but it is not used to limit the present invention. The present invention can also use the slits to replace the protrusions, or can use the protrusions and the slits simultaneously to perform alignment on the liquid crystal. Also, the alignment structure and the spacer can be located on at least one of the first substrate or the second substrate.

Figure 9:
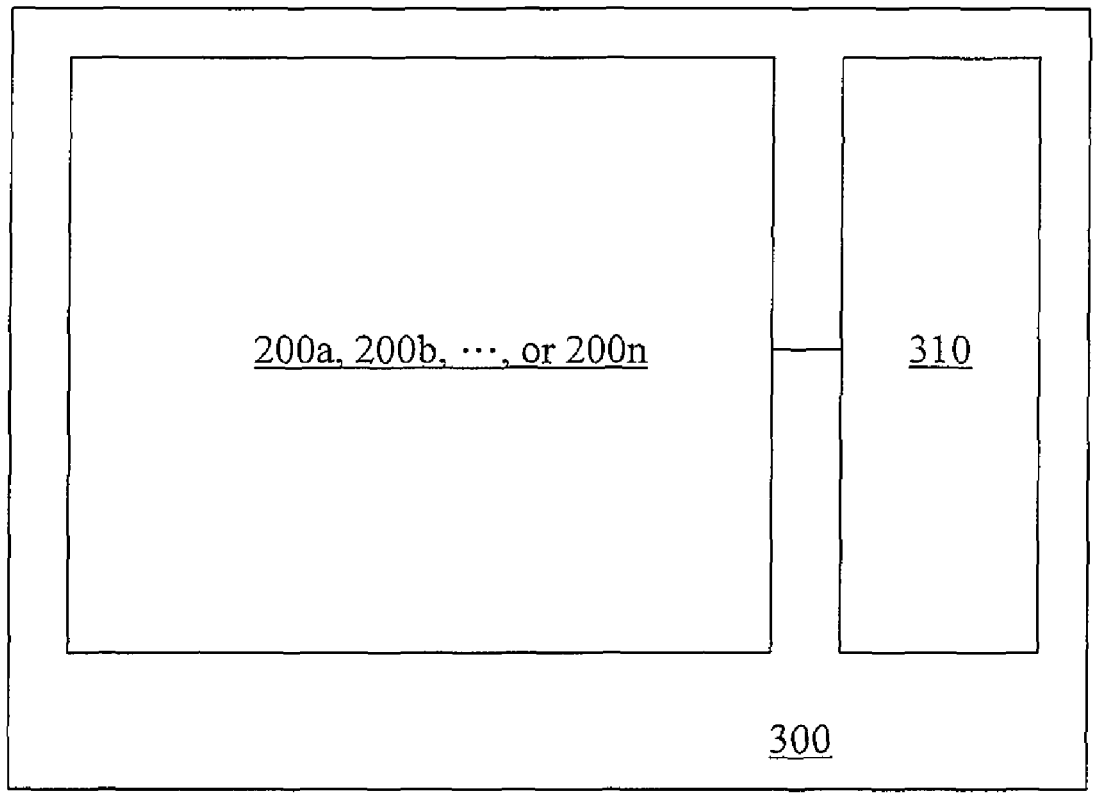
FIG. 9 is a schematic view of an opto-electronic apparatus of the present invention.

FIG. 9 is a schematic view of an opto-electronic apparatus of the present invention. Referring to FIG. 9, the LCD panels 200a to 200n of the embodiment of the present invention may also be applied in an opto-electronic apparatus 300, and the photoelectric apparatus 300 further has a electronic element 310 such as control element, operating element, processing element, input element, memory element, driving element, light emitting element, protecting element, or other functional element, or the combination thereof, which is connected to the LCD panels 200a to 200n. The types of the opto-electronic apparatus include the portable products (e.g. mobile phones, video cameras, cameras, notebook computers, game machines, watches, music players, electronic mail transceivers, map navigators, or the similar products), the audio visual products (e.g. audio visual players or the similar products), screens, TV sets, or signboards.

To sum up, the LCD panel of the present invention has at least the following advantages:

1. As the present invention adopts the spacer with the alignment function to replace the alignment pattern in a part of the sub-pixels, the spacer arrangement will not influence the aperture ratio of the sub-pixel.

2. In a part of the embodiments of the present invention, the designer can increase the area of the sub-pixel with the region according to the requirements (being substantially greater than the average of the area of the sub-pixel), and reduce the area of other sub-pixels (being substantially smaller than the average of the area of the sub-pixel), so as to make the effective display area of the sub-pixel with the region to be substantially equal to the effective display area of other sub-pixels, and further the LCD panel have an good display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
   a first substrate;
   a second substrate disposed above the first substrate;
   a plurality of signal lines disposed on the first substrate; and
   a plurality of sub-pixel sets, arranged between the first substrate and the second substrate, wherein each sub-pixel set comprises a plurality of sub-pixels electrically connected to the signal lines, each sub-pixel has at least one alignment pattern located therein, a reflective multi-domain display region and a transmissive multi-domain display region adjacent to the reflective multi-domain display region, and the alignment pattern located in one of the sub-pixels of each sub-pixel set is disposed between the first substrate and the second substrate as a spacer, the spacer is located in a part of the transmissive multi-domain display region.

2. An opto-electronic apparatus incorporating the LCD panel of claim 1.

3. The LCD panel of claim 1, wherein the sub-pixels are transflective sub-pixels, and the transflective sub-pixels comprise transflective sub-pixels with single cell-gap, transflective sub-pixels with dual cell-gap, or combinations thereof.

4. The LCD panel of claim 1, wherein each sub-pixel comprises:
   a common electrode disposed on the second substrate;
   an active device disposed on the first substrate;
   a reflective electrode disposed in the reflective multi-domain display region;
   a transmissive electrode disposed in the transmissive multi-domain display region, wherein the reflective electrode and the transmissive electrode are electrically connected to each other and electrically connected to the corresponding signal line through the active device; and
   a liquid crystal layer disposed between the common electrode and the reflective electrode and between the common electrode and the transmissive electrode.

5. The LCD panel of claim 1, further comprising a plurality of shielding patterns disposed corresponding to the alignment patterns located in the transmissive multi-domain display region, wherein areas of the shielding patterns are substantially equal.

6. The LCD panel of claim 4, wherein each reflective electrode has a planar region corresponding to the alignment patterns, and areas of the planar regions are substantially equal.

7. The LCD panel of claim 1, wherein the transmissive multi-domain display region comprises a first transmissive multi-domain display region and a second transmissive multi-domain display region adjacent to the first transmissive multi-domain display region, and each sub-pixel comprises:

a common electrode disposed on the second substrate;

an active device disposed on the first substrate;

a reflective electrode disposed in the reflective multi-domain display region;

a first transmissive electrode disposed in the first transmissive multi-domain display region;

a second transmissive electrode disposed in the second transmissive multi-domain display region, wherein the reflective electrode, the first transmissive electrode, and the second transmissive electrode are electrically connected to each other and electrically connected to the corresponding signal line through the active device; and a liquid crystal layer disposed between the common electrode and the reflective electrode and between the common electrode and the transmissive electrode.

8. The LCD panel of claim 7, further comprising:

a plurality of first shielding patterns disposed corresponding to a part of the alignment patterns located in the first transmissive multi-domain display regions; and a plurality of second shielding patterns disposed corresponding to a part of the alignment patterns located in the second transmissive multi-domain display regions, wherein areas of each first shielding pattern and each second shielding pattern are substantially equal.

9. The LCD panel of claim 7, wherein the spacers are located in a part of the second transmissive multi-domain display region.

10. The LCD panel of claim 9, further comprising a plurality of second shielding patterns disposed corresponding to the alignment patterns located in the second transmissive multi-domain display regions, wherein areas of the second shielding patterns are substantially equal.

11. The LCD panel of claim 7, wherein each reflective electrode has a planar region corresponding to the alignment patterns, and areas of the planar regions are substantially equal.

12. The LCD panel of claim 7, wherein the spacers are located in a part of the first transmissive multi-domain display region.

13. The LCD panel of claim 12, further comprising a plurality of first shielding patterns disposed corresponding to the alignment patterns located in the first transmissive multi-domain display regions, wherein areas of the first shielding patterns are substantially equal.

* * * * *